United States Patent
Kikinis (10) Patent No.: US 8,910,203 B2
(45) Date of Patent: Dec. 9, 2014

(54) METHOD FOR DISPLAYING CHANNEL LISTINGS IN AN ELECTRONIC PROGRAM GUIDE AND AN ELECTRONIC PROGRAM GUIDE IMPLEMENTING THE METHOD

(75) Inventor: Dan Kikinis, Saratoga, CA (US)

(73) Assignee: JLB Ventures LLC, Washington, DC (US)

( * ) Notice: Subject to any disclaimer, the term of this patent is extended or adjusted under 35 U.S.C. 154(b) by 2315 days.

(21) Appl. No.: 10/171,230

(22) Filed: Jun. 11, 2002

(65) Prior Publication Data

US 2003/0009757 A1    Jan. 9, 2003

Related U.S. Application Data

(60) Provisional application No. 60/299,532, filed on Jun. 19, 2001.

(51) Int. Cl.
| | |
|---|---|
| G06F 3/00 | (2006.01) |
| G06F 13/00 | (2006.01) |
| H04N 5/445 | (2011.01) |
| H04N 21/258 | (2011.01) |
| H04N 21/482 | (2011.01) |
| H04N 21/431 | (2011.01) |

(52) U.S. Cl.
CPC ..... H04N 21/4823 (2013.01); H04N 21/25866 (2013.01); H04N 5/44543 (2013.01); H04N 21/4314 (2013.01); H04N 21/4312 (2013.01)

USPC ........ 725/37; 725/2; 725/25; 725/38; 725/39; 725/40

(58) Field of Classification Search
USPC ............... 725/2, 22, 25, 44, 54, 56, 37–40, 725/46–47, 50–51
See application file for complete search history.

(56) References Cited

U.S. PATENT DOCUMENTS

| | | | |
|---|---|---|---|
| 5,526,034 A | 6/1996 | Hoarty et al. | |
| 5,550,578 A | 8/1996 | Hoarty et al. | |
| 5,592,551 A * | 1/1997 | Lett et al. | 380/211 |
| 5,990,927 A * | 11/1999 | Hendricks et al. | 725/132 |
| 6,034,678 A | 3/2000 | Hoarty et al. | |
| 6,100,883 A | 8/2000 | Hoarty | |
| 6,205,582 B1 | 3/2001 | Hoarty | |
| 6,664,984 B2 * | 12/2003 | Schlarb et al. | 715/826 |
| 7,103,905 B2 * | 9/2006 | Novak | 725/46 |
| 7,240,092 B2 * | 7/2007 | Houghton et al. | 709/203 |
| 7,600,245 B2 * | 10/2009 | Steading et al. | 725/52 |
| 2002/0184650 A1 * | 12/2002 | Stone | 725/131 |
| 2004/0268382 A1 * | 12/2004 | Kim | 725/25 |
| 2005/0283799 A1 * | 12/2005 | Domegan et al. | 725/38 |

* cited by examiner

Primary Examiner — Pankaj Kumar
Assistant Examiner — Charles N Hicks
(74) Attorney, Agent, or Firm — Banner & Witcoff, Ltd.

(57) ABSTRACT

A method for providing an electronic program guide is disclosed. The method comprises receiving subscription data indicating channels for which a subscription exists; and displaying a list of available channels wherein currently unsubscribed channels and currently subscribed channels are distinguished from each other.

17 Claims, 6 Drawing Sheets

METHOD FOR DISPLAYING CHANNEL LISTINGS IN AN ELECTRONIC PROGRAM GUIDE AND AN ELECTRONIC PROGRAM GUIDE IMPLEMENTING THE METHOD

PRIORITY

This application is related to, and hereby claims the benefit of, provisional application No. 60/299,532, which was filed Jun. 19, 2001 and is hereby incorporated by reference.

FIELD OF THE INVENTION

This invention relates to electronic program guides. In particular it relates to a method for displaying channel listings in an electronic program guide.

BACKGROUND

Television electronic programming guide (EPG) systems now in use offer one view of a programming space that shows programs on all the channels in the system, including video-on-demand, pay-per-view, and recorded programs. These EPGs also offer an alternative view which includes some variation of a favorites or most-viewed listing, which is composed by a viewer who selects channels for inclusion therein.

In some cases, even when a viewer has assembled a list of favorites, which is typically a small number of channels, the viewer may wish to view other channel listings on the EPG, but may not remember the channels, out of all the listed channels, for which subscriptions exist.

Because current EPGs show all channels including subscribed and unsubscribed channels, it is only after the viewer specifically selects a channel that the viewer may discover that a subscription for the channel does not exist. Part of the reason for showing all channels whether subscribed or unsubscribed is to promote programs on these channels. By making the listing available, the viewer has an incentive to subscribe to a channel if the viewer so chooses.

With the recent advent of personal video recorders (PVRs) and digital video recorders (DVRs), in combination with EPGs or IPGs, it can become extremely annoying for a viewer who may choose to record a program at some future time, only to discover, after the recording has occurred, that e.g. for two hours a message to call an 800 number because the user has not subscribed to the channel on which the program was aired.

There is thus a need for a system that lets a viewer discern whether a subscription for a channel exists at the time of viewing the EPG to select programs for viewing and/or recording, or a system that lets the viewer view an EPG mode where the EPG displays only the subscribed channels instead of all the channels in the system. At the very least, the EPG should give the viewer a warning at the time of selecting a program for future recording, that the channel is not subscribed.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one case" or "a case" means that a particular feature, structure, or characteristic described in connection with the case is included in at least one case of the invention. The appearances of the phrase "in one case" in various places in the specification are not necessarily all referring to the same case, nor are separate or alternative cases mutually exclusive of other cases. Moreover, various features are described which may be exhibited by some cases and not by others. Similarly, various requirements are described which may be requirements for some cases but not other cases.

Figure 1:
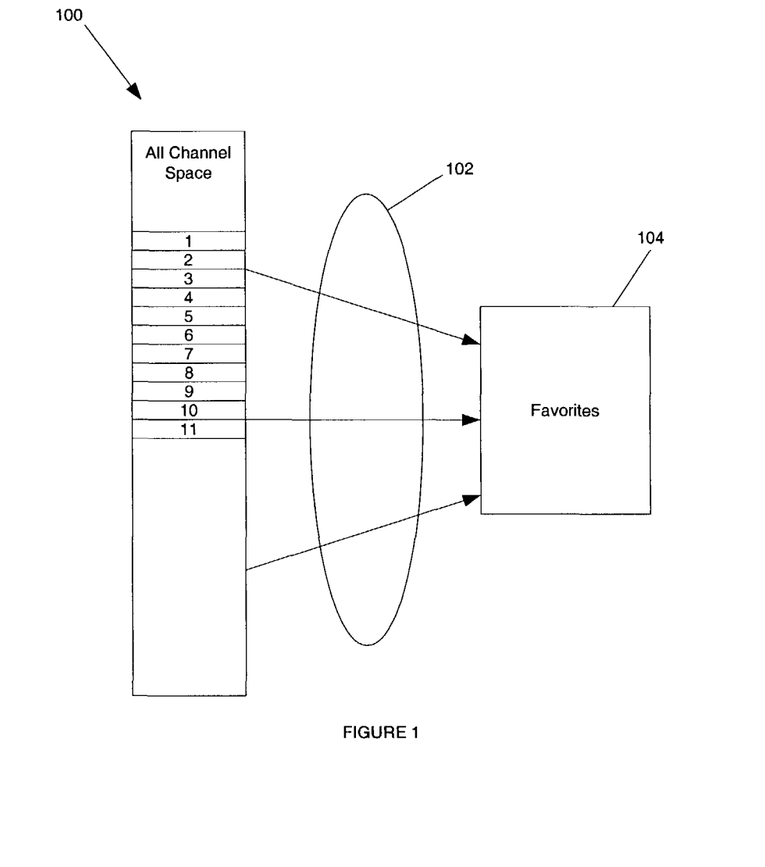
FIG. 1 shows a prior art technique for selecting channels to display in a favorites listing.

FIG. 1 of the drawings illustrates a method for composing a "favorites" or most-viewed listing known to the inventor. Referring to FIG. 1 an "all" channel listing space 100 includes all available channels whether subscribed, unsubscribed available, or unavailable. Typically, a user performs a selection process 102 whereby certain channels are selected from all channel space 100 for inclusion in a "favorites" channel listing 104. In the example, shown in FIG. 1 of the drawings, the all channel space 100 is shown to include 11 channels. Of these 11 channels, channels 1, 4, 8, 9 and 10 are subscribed, i.e. a subscription exists for these channels. Channels 5 and 6 are unavailable and the remaining channels are unsubscribed. In the favorites listing space 104 the channels are presented to the user without any differentiation indicating which channels are subscribed, unsubscribed, available, or unavailable. Thus, with the method illustrated in FIG. 1 of the drawings, it is possible that the user may waste a lot of time reading the channels in the favorites listing 104, and may not be able to view or record these channels. As mentioned earlier, the user may even have the experience of trying to record unavailable or unsubscribed channels without any notification that recording these channels would not be possible.

Figure 2:
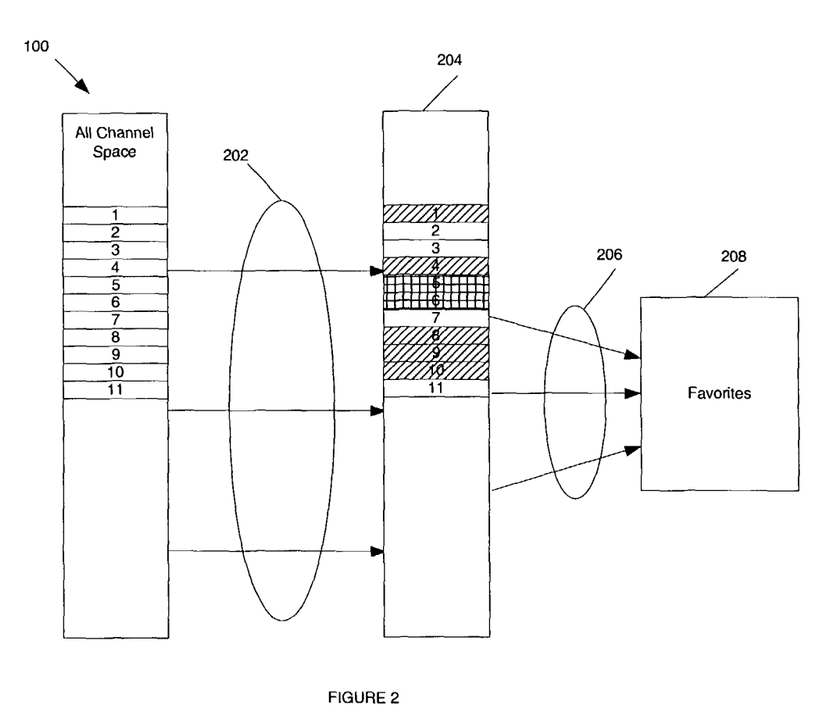
FIG. 2 shows a method for selecting channels for display in a favorites listing in accordance with one case.

FIG. 2 of the drawings illustrates one case of a method for displaying channel listings in accordance with the present invention. Referring to FIG. 2, reference numeral 100 indicates the all channel space already described with reference to FIG. 1.

One difference between the methods shown in FIG. 2 and FIG. 1 is that in the case of the method shown in FIG. 2, a process 202 is executed wherein channels from the all channel space 100 are classified as subscribed, unsubscribed, available, or unavailable, as the case may be. The classification of the channels is shown at 204 and enables the user to distinguish between subscribed, unsubscribed, available and unavailable channels. Thus, for example, in this case of channels 1, 4, 8, 9 and 10, in one case, selective highlighting may be used to indicate to the user that these channels are subscribed. Selective highlighting may also be used to indicate what channels saved and are unavailable. This allows the user to execute a selection process 206 whereby only subscribed and available channels may be selected for listing in a favorites listing space 208. It will be appreciated that by using the methods shown in FIG. 2 of the drawings the stated problem of the prior is avoided in that a user now has the ability to distinguish between subscribed and unsubscribed channels.

Figure 3:
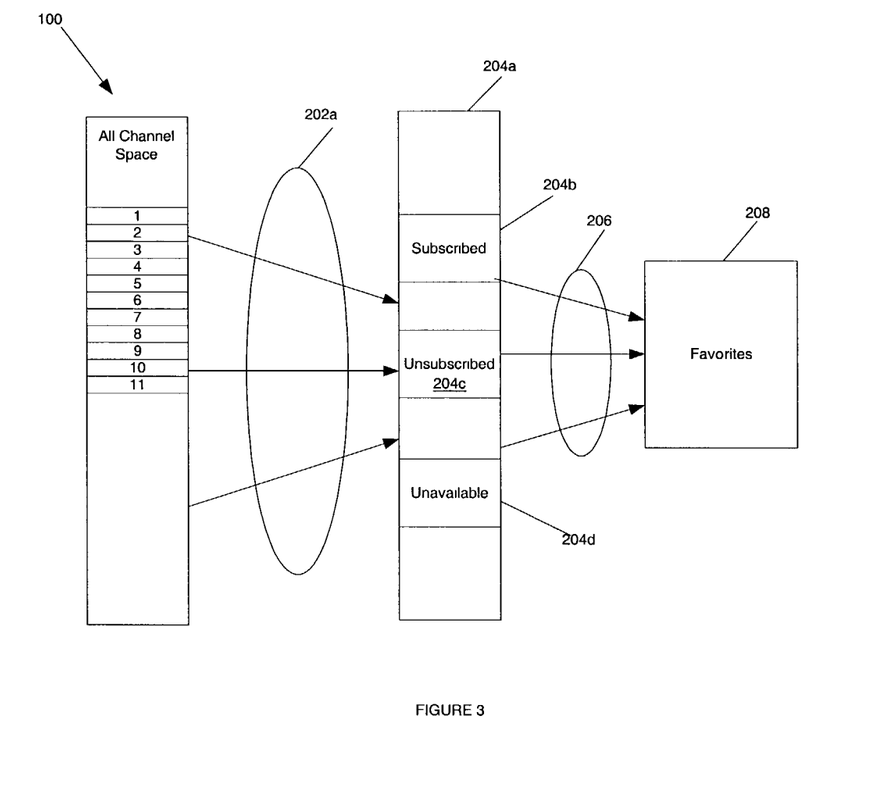
FIG. 3 shows a method for selecting channels to display in a favorites listing in accordance with another case.

Referring now to FIG. 3 of the drawings, a variation of the technique shown in FIG. 2 of the drawings is illustrated. In FIG. 3, certain reference numerals used in FIG. 2 have been retained to illustrate like or similar features or steps already described with reference to FIG. 2. The main difference between the techniques shown in FIG. 3 and FIG. 2 of the drawings is that in the technique shown in FIG. 3, a process 202a is executed wherein channels from the all channel space 100 are classified as being subscribed, unsubscribed, and unavailable in a manner that all subscribed channels appear at one location 204b, or unsubscribed channels appear at another location 204c, and all unavailable channels at a location 204d. Each of the locations 204b-d are locations within a channel listing space 204a. Thus, a user may execute a process 206 to select certain channels from the subscribed channel location 204b for inclusion in a favorite listing 208. The advantage of having the listing space 204a is that all unsubscribed and unavailable channels may be respectively collapsed into locations 204c and 204d thus making it easier for a view to occur to the subscribed channels which are conveniently located within locations 204b.

In order to implement the method shown in FIGS. 2 and 3 of the drawings, at a head-end of a television station, subscription data indicating which channels a particular user has subscribed to is retrieved and thereafter distributed to the user, based on an ID of the user's set-top box(es). In some cases a user may have different subscriptions in different rooms on different boxes. The distribution may be over-the-air and, in some cases, may include a link which can be used by the set-top box to determine which channels the user has a subscription for based on predefined packages which are stored locally within the set-top box. In other cases, distribution of the subscription data may include transmitting, over the air, the channel subscriptions for each set-top box. In yet another case, a link which identifies a predefined subscription package to which a user has subscribed is broadcast to a particular set-top box which then uses the link together with broadcast subscription data including additions and deletions to the predefined subscription package to determine which channels are currently subscribed and to display same in accordance with the systems described above.

Figure 4:
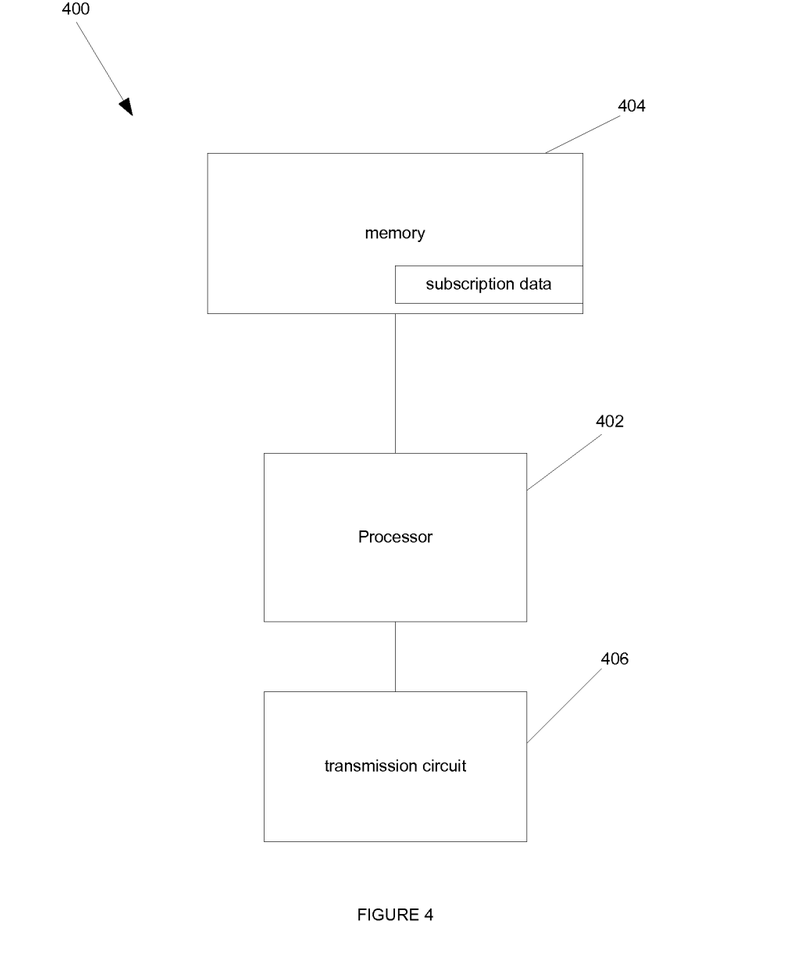
FIG. 4 shows a high-level block diagram of a head-end system in accordance with one case.

Accordingly, in one case, a head-end system 400 (see FIG. 4) of a television system may include a processor 402, a memory 404 which includes the subscription data, and a transmission circuit 406 for transmitting the subscription data. The system 400 includes instructions in memory 404 to perform the methods described above.

Figure 5:
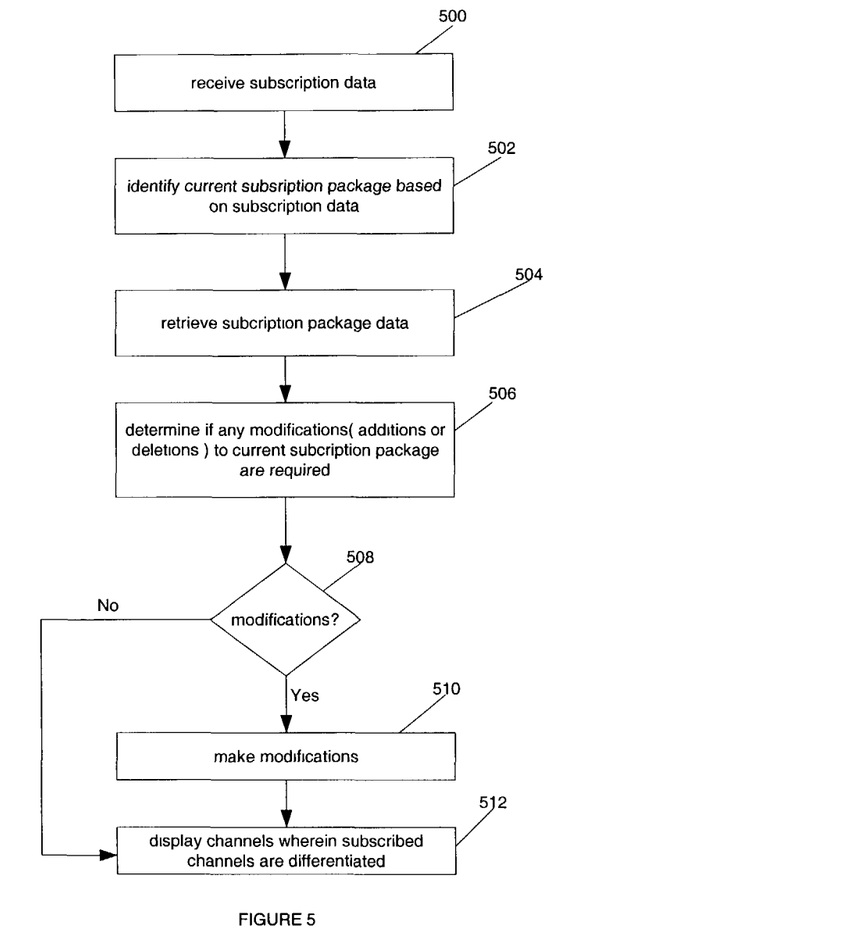
FIG. 5 shows a flow chart of operations performed by a set-top box in accordance with one case.

FIG. 5 of the drawings shows one case how techniques described above with reference to FIGS. 2 and 3 may be implemented by a set-top box in accordance with the invention. According to FIG. 5 at block 500 the set-top box receives subscription data from a head-end of a television system. The subscription data may include individual channels for which a subscription exists or may include a link identifying a predetermined subscription package which is stored in the set-top box. Thus, at block 502, the set-top box uses the subscription data (link) to identify a current subscription package based on the subscription data (link). Once the current subscription package has been identified, then the set-top box retrieves, at 504, the subscription package data from a memory. At 506, the set-top box determines if any modifications i.e. additions or deletions are to be made to the current subscription package based on the subscription data. For example, the subscription data, in addition to the link identifying the predefined subscription package, may include data indicating that certain channels are to be added to the subscription package or certain channels may have to be deleted from the subscription package. At block 508, if modifications are determined then control is passed to block 510 wherein the modifications are made, in other words the channel deletions or additions are made. At block 512 the channels are displayed in a manner such that the subscribed channels are differentiated as described above. This allows the user to make selections of subscribed channels for listing in a favorite space as described.

Figure 6:
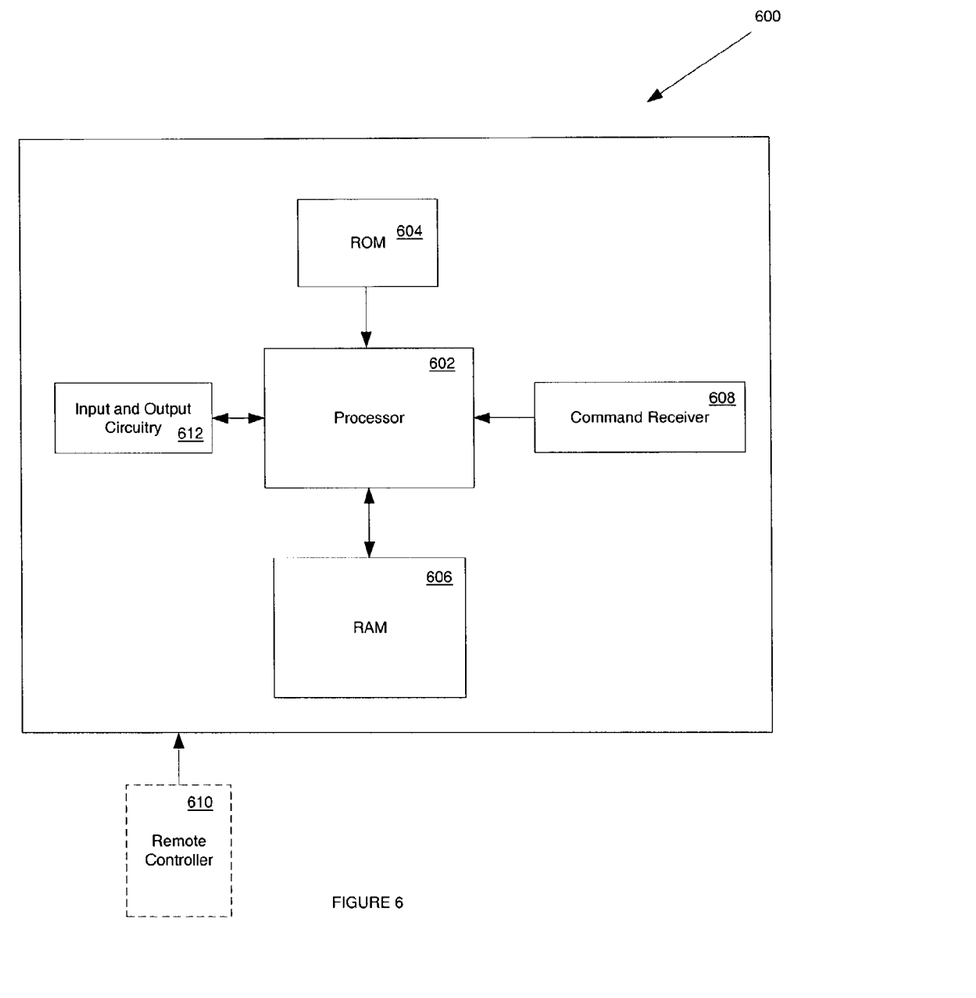
FIG. 6 shows a high-level block diagram of a set-top box in accordance with one case.

FIG. 6 of the drawings shows a block diagram of an EPG system 600 in accordance with one case of the invention. The system includes a processor 602 and a read-only memory storage 604 which stores a sequence of instructions which when executed by a processor 602 causes processor 602 to perform a method for implementing an EPG as described. The components of system 600 include a random access memory 606 wherein a database storing programming information are described above is stored. A command receiver 608 is coupled to processor 602 and includes circuitry to receive user input command to control operation of system 600. Such user input commands are typically input via a remote control 610. System 600 also includes input and output circuitry 612 which is coupled to processor 602, via which programming information from a head-end may be received. Circuitry program 602 may be used to perform the methods described above. The design integration of blocks 602, 604, 606, 608 and 612 are well known and therefore not further described.

For the purposes of this specification, a computer-readable medium includes any mechanism that provides (i.e. stores and/or transmits) information in a form readable by a machine (e.g. computer) for example, a computer-readable medium includes read-only memory (ROM); random access memory (RAM); magnetic disk storage media; optical storage media; flash memory devices; electrical, optical, acoustical or other form of propagated signals (e.g. carrier waves, infra red signals, digital signals, etc.); etc.

Although the present invention has been described with reference to specific exemplary cases, it will be evident that the various modification and changes can be made to these cases without departing from the broader spirit of the invention as set forth in the claims. Accordingly, the specification and drawings are to be regarded in an illustrative sense rather than in a restrictive sense.

What is claimed is:

1. A method for providing an electronic program guide, the method comprising:

receiving a list of available channels, wherein the list of available channels includes a plurality of channels with each of the plurality of channels comprising a predetermined schedule of content to be displayed on the channel, wherein a first subset of the plurality of channels includes a plurality of currently subscribed channels with each of the plurality of currently subscribed channels being a channel comprising content which a user is permitted access according to a subscription, and wherein a second subset of the plurality of channels includes a plurality of currently unsubscribed channels with each of the plurality of currently unsubscribed channels being a channel comprising content which the user in not permitted access according to the subscription;

receiving subscription data indicating the plurality of currently subscribed channels and the plurality of currently unsubscribed channels; and displaying the list of available channels, wherein the plurality of currently unsubscribed channels are simultaneously displayed with and visually distinguished from the plurality of currently subscribed channels in the displayed list of available channels, wherein the plurality of currently unsubscribed channels are visually distinguished from the plurality of currently subscribed channels using selective highlighting, and wherein the selective highlighting includes providing a first background on a first plurality of rows in the displayed list of available channels which list the plurality of currently unsubscribed channels, and providing a second background different from the first background on a second plurality of rows in the displayed list of available channels which list the plurality of currently subscribed channels.

2. The method of claim 1, wherein the subscription data comprises an identifier to identify the plurality of currently subscribed channels based on a predefined subscription package.

3. The method of claim 2, further comprising determining the plurality of currently subscribed channels based on the identifier.

4. The method of claim 2, wherein the subscription data further comprises a list of channel subscription additions or deletions to the predefined subscription package.

5. The method of claim 1, further comprising requesting the subscription data, the receiving the subscription data then being in response to the requesting.

6. A method for providing an electronic program guide, the method comprising:
    receiving a list of available channels, wherein the list of available channels includes a plurality of channels with each of the plurality of channels comprising a predetermined schedule of content to be displayed on the channel;
    determining if a subscription for a first channel of the plurality of channels exists, wherein the subscription does exist if a user is permitted access to content displayed on the first channel, and wherein the subscription does not exist if the user is not permitted access to the content displayed on the first channel;
    generating a list of available channels including the first channel; and
    displaying the list of available channels as an electronic program guide, wherein, in response to determining the subscription to the first channel does not exist, the electronic program guide visually distinguishes the first channel from a plurality of currently subscribed channels in the list of available channels, wherein the first channel is visually distinguished from the plurality of currently subscribed using selective highlighting, and wherein the selective highlighting includes providing a first background on a row in the displayed list of available channels which lists the first channel, and providing a second background different from the first background on a plurality of rows in the displayed list of available channels which list the plurality of currently subscribed channels.

7. The method of claim 6, further comprising receiving subscription data over the air.

8. The method of claim 7, wherein the subscription data comprises an identifier to identify a predefined subscription package comprising the plurality of subscribed channels.

9. The method of claim 8, wherein the subscription data further comprises a list of channel subscription additions or deletions to the predefined subscription package.

10. The method of claim 9, further comprising receiving data comprising predefined subscription packages; and storing the predefined subscription packages.

11. The method of claim 10, further comprising identifying the predefined subscription package comprising the plurality of subscribed channels, wherein the determining comprises modifying the identified predefined subscription package based on the channel subscription additions or deletions.

12. One or more non-transitory computer readable media storing computer readable instructions that, when executed by a processor, cause the processor to perform a method comprising:
    receiving a list of available channels, wherein the list of available channels includes a plurality of channels with each of the plurality of channels comprising a predetermined schedule of content to be displayed on the channel, wherein a first subset of the plurality of channels includes a plurality of currently subscribed channels with each of the plurality of currently subscribed channels being a channel comprising content which a user is permitted access according to a subscription, and wherein a second subset of the plurality of channels includes a plurality of currently unsubscribed channels with each of the plurality of currently unsubscribed channels being a channel comprising content which the user in not permitted access according to the subscription;
    receiving subscription data indicating the plurality of currently subscribed channels and the plurality of currently unsubscribed channels; and
    displaying the list of available channels, wherein the plurality of currently unsubscribed channels are simultaneously displayed with and visually distinguished from the plurality of currently subscribed channels in the displayed list of available channels by collapsing the plurality of subscribed channels at a first location in the displayed list of available channels and collapsing the plurality of unsubscribed channels at a second location different from the first location in in the displayed list of available channels, wherein the first location includes a first list of each of the plurality of subscribed channels with none of the plurality of unsubscribed channels listed therebetween, and wherein the second location includes a second list of each of the plurality of unsubscribed channels with none of the plurality of subscribed channels listed therebetween.

13. The one or more non-transitory computer readable media of claim 12, wherein the plurality of currently subscribed channels are distinguished from the plurality of currently unsubscribed channels using selective highlighting.

14. The one or more non-transitory computer readable media of claim 12, wherein the subscription data comprises an identifier to identify the plurality of currently subscribed channels based on a predefined subscription package.

15. The one or more non-transitory computer readable media of claim 14, wherein the method further comprises determining the plurality of currently subscribed channels based on the identifier.

16. The one or more non-transitory computer readable media of claim 15, wherein the subscription data further comprises a list of channel subscription additions or deletions to the predefined subscription package.

17. The one or more non-transitory computer readable media of claim 12, wherein the method further comprises requesting the subscription data, the receiving the subscription data then being in response to the requesting.

\* \* \* \* \*